Patented Apr. 21, 1936

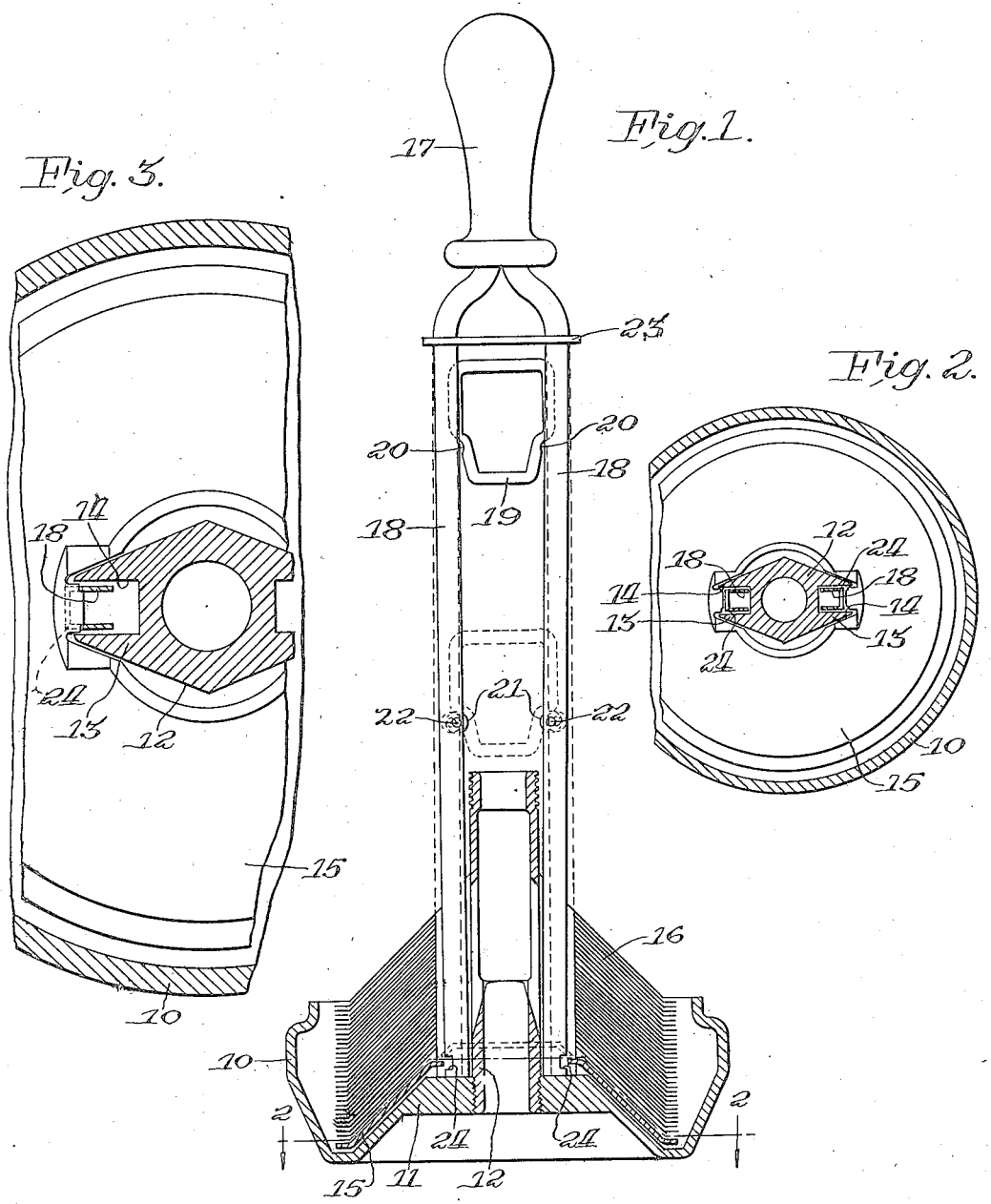

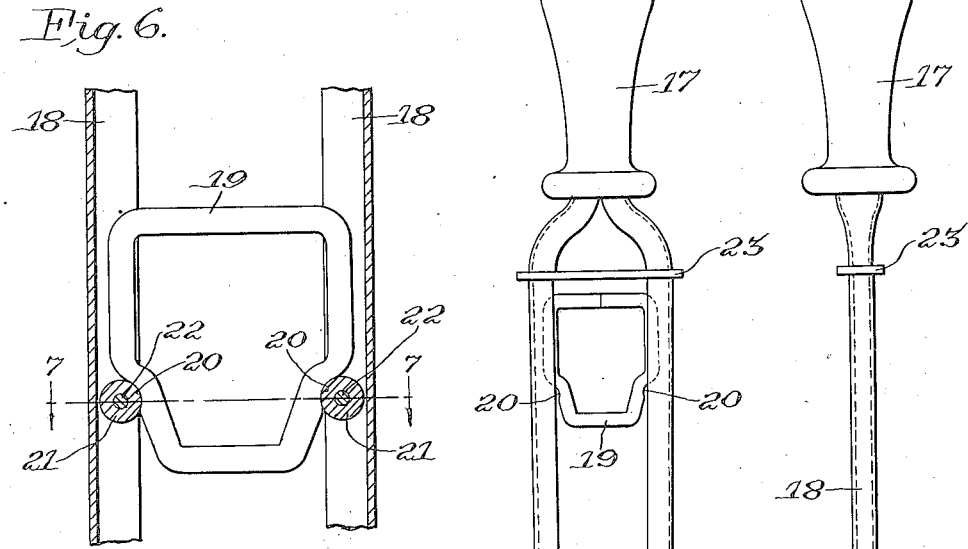
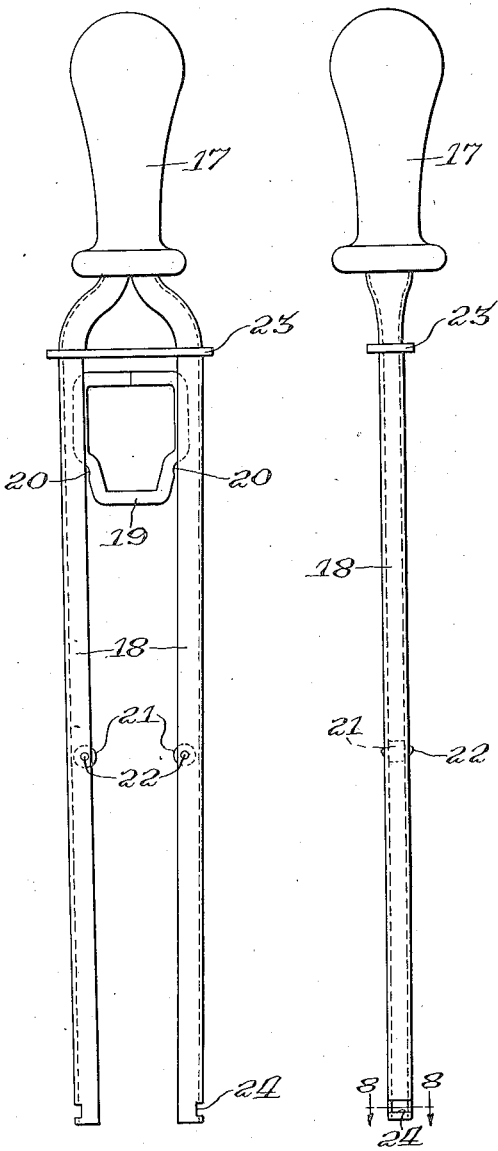
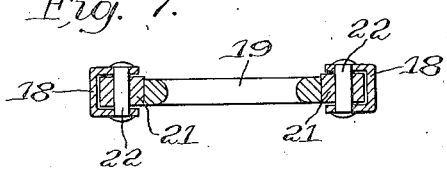
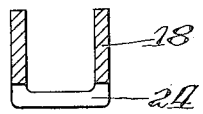

2,037,979

UNITED STATES PATENT OFFICE 2,037,979

DISK REMOVING TOOL FOR CREAM SEPARATORS

William H. Harstick, Milwaukee, Wis., assignor to International Harvester Company, a corporation of New Jersey Application April 4, 1935, Serial No. 14,626

9 Claims. (Cl. 29—84)

The invention relates to a device for removing the stack of disks from the bowl of a cream separator for the purpose of facilitating the washing and cleaning thereof.

In centrifugal cream separators, the separating bowl contains a stack of superimposed conical disks which are supported in the bowl in a certain order or arrangement. These disks must be frequently removed from the bowl, so that they may be washed, and in this connection it is absolutely essential that the order or arrangement of the disks in the stack be not changed.

Accordingly, the primary object of the invention is to provide a handy device or tool for readily removing the stack of disks from the bowl in such a way that they will be kept in their proper order or relative positions, whereby said disks may be easily moved apart for washing and then be reassembled conveniently within the bowl.

Another object is to provide an improved latching means for the tool to prevent the stack of disks from being accidentally displaced therefrom while handling the disks.

Other important objects will follow as the disclosure is more fully made.

These objects are attained by the tool illustrated in the accompanying sheets of drawings, wherein is shown one practicable form of the invention. Briefly, said tool embodies a handle fastened to a pair of spaced legs, which are of special construction and include at their free ends a notch to engage the bottom-most disk of the stack. A sliding latch member is movable along the legs to spread them into tight gripping relation with the said lower disk and a releasable lock is provided between the legs and slidable latch to insure that such gripping action of the lower ends of the legs relative to the lower disk will be maintained as desired while handling the disks.

In the drawings:

Figure 1 is an elevational view of the tool in position in the cream separator bowl, the latter appearing in section to show the disks therein and the manner of associating the improved tool therewith;

Figure 2 is a transverse sectional view taken along the line 2—2 of Figure 1, looking in the direction of the arrows, to show the relationship of the lower ends of the tool legs before they are spread into gripping relation with the lower disk;

Figure 3 is a similar view, on an enlarged scale, showing the lower end of one leg as it appears when spread into gripping engagement with the lower disk;

Figure 4 is a side elevational view of the tool per se;

Figure 5 is an end elevational view of the tool;

Figure 6 is an enlarged, fragmentary detail view, partly in section, to show the sliding latch and lock means therefor;

Figure 7 is a detail, transverse sectional view of the same latch and lock means, taken along the line 7—7 of Figure 6, looking in the direction of the arrows; and, Figure 8 is a detail cross sectional view through the lower locking end of one of the tool legs taken along the line 8—8 of Figure 5, looking in the direction of the arrows.

Looking at Figures 1, 2 and 3, there is shown a cream separator bowl 10 having a conical raised bottom 11 carrying a vertical tubular shaft 12, embodying oppositely disposed wings 13, each formed with a vertical channel shaped passage 14. Passed down over the shaft 12 and supported on the bottom 11 of the bowl is a bottom conical disk 15 and on top of said disk 15, and also passed down over the shaft 12 is supported a stack of spaced, conical separator disks 16, all of which are respectively notched in vertical alignment to fit down loosely over the wings 13 in an obvious manner.

As shown in Figures 4 and 5, the disk removing tool comprises a suitable handle 17 having appropriately fastened therein a pair of spaced legs 18, which converge slightly toward one another normally, as appears in Figure 4. Each of these legs is channel-shaped, as shown in Figure 7, with the open channels facing each other for slidably receiving a latch ring 19, which has opposite points thereof notched as at 20 to lock releasably over rollers 21 mounted respectively on pins 22 carried in the channel legs 18, as seen in Figure 6. A stop plate 23 is appropriately fastened across the legs 18 adjacent to where they join with the handle 17, said plate obviously serving to brace the legs and to limit the upward sliding movement of the latch ring 19. The lower end of each leg 18 at the outer side and across the bight of the channel is formed with a cross notch 24 for a purpose now to appear in connection with the description of the operation and use of the improved disk removing tool.

In this connection, it will be assumed that it is desired to remove the stack of disks from the cream separator bowl 10. First, the cover of the bowl, which is not shown, is removed to expose the disks, as appears in Figure 1. With the latch ring 19 in the raised full line position, the tool is now grasped by the handle 17 to thread or insert the legs 18 downwardly through the opposite notches 14 of the tubular shaft wings 13, in an obvious manner. Thus, the two legs pass down through all of the disks in the stack, as appears in Figure 1, until the notches 24 are in position adjacent the bottom disk 15. Thereupon the latch ring 19 is manually slid down the channel legs 18 to the dotted line position thereof shown in Figure 1, until the opposite notches 20 therein releasably lock over the adjacent rollers 21. This movement of the ring 19 has obviously caused the legs 18 at their lower ends to spread apart, as appears in the dotted lines in said Figure 1, to grip and tightly engage the notches 24 with the inner peripheral edge of the bottom disk 15. Thus, the tool is now locked to the stack of disks, permitting their ready removal from the bowl 10 for washing and cleansing purposes. By reversing the steps just described, the disks may obviously be returned properly to the bowl.

The intention is to cover all changes and modifications which do not depart from the spirit and scope of the invention as indicated by the appended claims.

What is claimed is:

1. A tool for removing the stack of conical disks from the bowl of a cream separator, or the like, said tool having a pair of legs which converge normally slightly toward each other, said legs adapted to be passed downwardly through the stack of disks and including means to engage the lowermost disk of the stack, and a member slidably carried on the legs for spreading them apart to cause their lower ends to be positively locked with said lower disk.

2. A tool for removing the stack of conical disks from the bowl of a cream separator, or the like, said tool having a pair of legs which converge normally slightly toward each other, said legs adapted to be passed downwardly through the stack of disks and each being provided adjacent its lower end with a notch to engage the lower disk, and means on the legs for positively spreading the legs apart to cause the notches to be tightly gripped with the said lower disk.

3. A tool for removing the stack of conical disks from the bowl of a cream separator, or the like, said tool having a pair of channel-shaped legs which normally converge slightly toward each other, said legs adapted to be passed downwardly through the stack of disks and including means adjacent their lower ends to engage the lowermost disk of the stack, and a member slidably mounted in the channel legs to spread the legs apart to cause the means mentioned to positively be latched to the said lower disk.

4. A tool for removing the stack of conical disks from the bowl of a cream separator, or the like, said tool having a pair of channel-shaped legs which normally converge slightly toward each other, said legs adapted to be passed downwardly through the stack of disks and including a notch formed at the lower end of each leg to engage the lowermost disk in the stack, and a ring member slidably mounted in the channel legs for spreading the legs apart to cause the notches firmly to grip the said lower disk.

5. A tool for removing the stack of conical disks from the bowl of a cream separator, or the like, said tool having a pair of channel-shaped legs which normally converge slightly toward each other, said legs adapted to be passed downwardly through the stack of disks and including a notch formed at the lower end of each leg to engage the lowermost disk in the stack, oppositely disposed rollers mounted one each on each channel leg, and a slide carried in the channel legs to spread them apart to grip the notches with the lower disk, said slide including means releasably to lock with the said rollers.

6. A tool for removing the stack of conical disks from the bowl of a cream separator, or the like, said tool having a pair of channel-shaped legs which normally converge slightly toward each other, said legs adapted to be passed downwardly through the stack of disks and including a notch formed at the lower end of each leg to engage the lowermost disk in the stack, oppositely disposed rollers mounted one each on each channel leg, and a ring member slidably carried in the channel legs to spread them apart to grip the notches with the lower disk, said ring member having portions formed therein releasably to lock with the said rollers.

7. A tool for removing the stack of disks from the bowl of a cream separator, or the like, said tool comprising a pair of spaced legs of channeled cross section adapted to be passed down through the stack of disks and including means to grip the lowermost disk of the stack, and a latching slide member movable within the channel of the legs.

8. A tool for removing the stack of disks from the bowl of a cream separator, or the like, said tool comprising a handle carrying a pair of spaced legs of channeled cross section adapted to be passed down through the stack of disks and having associated therewith means for positively latching said legs to the lowermost disk of the stack, and an operating member slidably carried within the channel of the legs.

9. A tool for removing the stack of conical disks from the bowl of a cream separator, or the like, said tool having a pair of legs which converge normally slightly toward each other, said legs adapted to be passed downwardly through the stack of disks and each being provided adjacent its lower end with means to engage the lower disk, and a latch member slidably carried by the legs for causing them to be spread apart for firmly locking the same with said lower disk, and releasable lock means to hold the latch member in its locking position.

WILLIAM H. HARSTICK.